(12) United States Patent
Armbruster et al.

(10) Patent No.: US 7,072,747 B2
(45) Date of Patent: Jul. 4, 2006

(54) STRATEGIES FOR LOCOMOTIVE OPERATION IN TUNNEL CONDITIONS

(75) Inventors: Robert A. Armbruster, Erie, PA (US); Wolfgang Daum, Erie, PA (US); Scott M. Branka, Erie, PA (US); Carl Iszkula, Girard, PA (US); Brian Lawry, Erie, PA (US)

(73) Assignee: General Electric Company, Schenectady, NY (US)

( * ) Notice: Subject to any disclaimer, the term of this patent is extended or adjusted under 35 U.S.C. 154(b) by 306 days.

(21) Appl. No.: 10/718,313

(22) Filed: Nov. 20, 2003

(65) Prior Publication Data

US 2005/0109882 A1    May 26, 2005

(51) Int. Cl.
*G05D 1/00* (2006.01)
*G05D 3/00* (2006.01)

(52) U.S. Cl. .................. 701/19; 701/20; 246/122 R; 246/167 R

(58) Field of Classification Search .............. 701/19, 701/20, 29, 33; 340/438, 439; 104/18, 284, 104/285; 246/108, 122 R
See application file for complete search history.

(56) References Cited

U.S. PATENT DOCUMENTS

| | | | |
|---|---|---|---|
| 4,037,526 A * | 7/1977 | Jaekle | .............. 454/166 |
| 4,698,761 A | 10/1987 | Cooper et al. | |
| 5,392,741 A | 2/1995 | Uzkan | |
| 5,425,338 A | 6/1995 | Gottemoller | |
| 5,561,602 A | 10/1996 | Bessler et al. | |
| 6,041,216 A | 3/2000 | Rose et al. | |
| 6,799,096 B1 | 9/2004 | Franke et al. | |

FOREIGN PATENT DOCUMENTS

| | | |
|---|---|---|
| JP | 07117669 A | 5/1995 |
| JP | 10329717 A | 12/1998 |

* cited by examiner

*Primary Examiner*—Gertrude A. Jeanglaude
(74) *Attorney, Agent, or Firm*—Carlos L. Hanze; William D. Sartor; Beusse Wolter Sanks Mora & Maire, P.A.

(57) ABSTRACT

A method of controlling operation of a train (T) for passage of the train through a tunnel. The train has a plurality of locomotives (L1-Ln) pulling the train. The position of the lead locomotive relative to the tunnel entrance is determined, as is the amount of time before the train enters the tunnel. Each locomotive is separately configured for passage through the tunnel as a function of performance characteristics of the locomotive and the locomotive's current operating status, as the train approaches the tunnel. Once the train enters the tunnel, the performance characteristics of each locomotive are continually monitored. The performance requirements for one or more of the locomotives are then dynamically changed as a function of conditions within the tunnel and the current performance characteristics of each locomotive. This is done to maintain a sufficient combined performance capability from the locomotives to move the train through the tunnel. Upon exiting the tunnel, the locomotives' full operating capabilities are quickly restored by enhancing their thermal recoveries.

28 Claims, 2 Drawing Sheets

STRATEGIES FOR LOCOMOTIVE OPERATION IN TUNNEL CONDITIONS

CROSS-REFERENCE TO RELATED APPLICATIONS

None.

STATEMENT REGARDING FEDERALLY SPONSORED RESEARCH OR DEVELOPMENT

Not Applicable.

BACKGROUND OF THE INVENTION

This invention relates to operation of a plurality (consist) of locomotives used to pull a train of cars; and, more particularly, to configuring the locomotives prior to entering a confined area such as a tunnel, snow shed, or other environmental restrictive area which may deprive a locomotive of combustible air and effect cooling of a locomotive's engine. It further relates to operation of the locomotives during passage through the tunnel, shed or area, and recovery of the engine upon exiting the tunnel, shed or area.

Referring to FIGS. 1A and 1B, a train T is shown to include a number of engines or locomotives L1-Ln for pulling a train of cars C. The number of locomotives required is a function of the weight of the cars comprising the train and the tonnage of the lading they carry. In FIG. 1A, the locomotives are shown connected together at the head of the train. In FIG. 1B, the locomotives are shown positioned at intervals along the length of the train. These are the two most common configurations. Regardless of the arrangement of locomotives, it is important that the combined tractive effort from all the locomotives be sufficient to move the train over a desired route despite the conditions encountered during transit.

One condition periodically effecting train operation is its passage through a confined area such as a tunnel. Tunnels vary in length from relatively short to more than two miles in length. On some routes tunnels are few and far apart. On other routes, there are many tunnels and they are spaced quite close together. Tunnels create two problems significantly effecting locomotive performance. First, because of the confined space within a tunnel, the amount of air available for combustion in a locomotive's diesel engine can be severely limited. Second, air does not necessarily circulate very well within a tunnel. The resulting reduced air-flow effects the degree to which a locomotive's engine can be cooled. Overheating can ruin an engine. As a rule, when a diesel engine's oil temperature reaches approximately 230° F., it is necessary to begin reducing the engine's output power. This is commonly referred to as "derating" the engine. If the oil temperature reaches approximately 240° F., then it is important to effectively take the engine off-line and place it in an "idle" mode of operation.

During passage through a tunnel, and referring to FIGS. 1A and 1B, lead locomotive L1 will have more air available to it than locomotive L2; locomotive L2 more air than the next locomotive, and so forth. As the lead engines pass through the tunnel, their exhaust gases fill up the tunnel space, depleting the amount of air available to the remaining locomotives for combustion. In addition, the temperature in the tunnel rises as a result of the heat produced by the exhaust gases from the diesel engines. As tunnel temperature increases, there will be less heat dissipation from the trailing locomotives, because the temperature differential between the engine and the atmosphere has decreased. As a result, and the temperatures of these locomotives will tend to rise faster than the corresponding engine temperatures of the lead locomotives.

Those skilled in the art will appreciate that the above described problems mostly effect freight trains which travel through tunnels at fairly low rates of speed (8–10 mph) as opposed to passenger trains which typically have fewer cars, less weight, and travel through tunnels at higher speeds. However, passenger trains are subject to the same problems.

Currently, in multi-locomotive train operations, each locomotive is separately derated prior to entering a tunnel, the tractive effort of each locomotive being based upon factors including the cooling system capabilities of the locomotive, the altitude at which the train is operating, and ambient air temperature, among others. Altitude is important because the higher the elevation of the tunnel, the less oxygen there is. Ambient temperature is important because the cooler the temperature the greater the amount of heat which can be transferred from the engine to the atmosphere to cool the engine.

Because current tunnel operations involve a separate configuration of each engine for passage through the tunnel, and because changes to a locomotive may be necessary after entering the tunnel, due to oxygen availability, air circulation, and heat loads in the tunnel, operation of the train is inefficient, also, breakdowns can occur. There is nothing presently available to optimize locomotive configuration prior to tunnel entry, and subsequently to control configuration changes in response to tunnel conditions. There is also not a procedure currently available to optimize engine recovery as the locomotives approach the tunnel exit and leave the tunnel.

BRIEF SUMMARY OF THE INVENTION

Briefly stated, the present invention is directed to a system and a method for configuring each locomotive in a train employing multiple locomotives prior to entry of the train into a confined area, for reconfiguring the locomotives during passage of the train through the confined area depending upon conditions encountered therein, and for expediting engine recovery as the locomotives exit the confined area.

The method involves first supplying the locomotives information as to the location of a tunnel entrance, if available, and determining the amount of time before the lead locomotive enters the tunnel. In accordance with the invention, all of the locomotives are configured for tunnel passage prior to entering the tunnel so to distribute the tractive power required to pull the train through the tunnel in a predetermined manner. After the train enters the tunnel, tunnel conditions and the operating condition of each locomotive are continuously monitored to determine if there is any significant change in an engine's performance. If a locomotive begins to overheat, for example, it can be derated simultaneously with another locomotive being brought on line so to maintain sufficient tractive effort to move the train through the tunnel. The method is designed to provide a dynamic response to changed tunnel conditions in this regard. Upon exiting a tunnel, the method of the invention facilitates returning all of the locomotives quickly back to a desired level of operation.

The result is a significant improvement in the efficiency of train operations before, during, and after passage through a tunnel.

The system and method of the invention further function to determine when the locomotives enter a tunnel, even if position information is not readily available and to dynamically effect reconfiguring of each locomotive in response to sensed conditions within the tunnel, and at the exit from the tunnel. The system and method operate to maintain sufficient overall tractive effort to move the train through the tunnel as expeditiously as possible and to return any locomotives derated during passage through the tunnel back to their fully rated condition as quickly as possible upon exiting the tunnel. The system and method operate over a wide range of conditions including the fact that tunnel entrance information may not always be available, or that conditions within a tunnel may not be as expected, particularly when other trains have recently passed through the same tunnel depleting available oxygen within the tunnel and raising the temperature within the tunnel.

The foregoing and other objects, features, and advantages of the invention as well as presently preferred embodiments thereof will become more apparent from the reading of the following description in connection with the accompanying drawings.

BRIEF DESCRIPTION OF THE SEVERAL VIEWS OF THE DRAWINGS

In the accompanying drawings which form part of the specification.

Corresponding reference numerals indicate corresponding parts throughout the several figures of the drawings.

DESCRIPTION OF THE PREFERRED EMBODIMENT

The following detailed description illustrates the invention by way of example and not by way of limitation. The description clearly enables one skilled in the art to make and use the invention, describes several embodiments, adaptations, variations, alternatives, and uses of the invention, including what is presently believed to be the best mode of carrying out the invention.

The present invention is directed to passage of a train T through a tunnel X, or a snow shed (not shown) or environmental restrictive area (also not shown). For convenience, throughout this description and the accompanying claims, the term tunnel shall also be meant to include snow sheds and other environmental restrictive areas where a locomotive may be deprived of combustion air and/or cooling.

The train has multiple locomotives L1-Ln as previously described. The system and method of the invention can be separated into three phases:

First, because it is known that conditions within the confined spaces defined by a tunnel are significantly different than those experienced in the open atmosphere, the locomotives within the train consist are each configured, prior to the train entering the tunnel, for passage through the tunnel. This requires determining, if possible, when the train is approaching the entrance to the tunnel, the anticipated tractive effort which will be required to move the train through the tunnel, and a preferred operational configuration for each locomotive L1-Ln based upon anticipated tunnel conditions.

Second, as the train passes through the tunnel, both tunnel and locomotive conditions are monitored. This involves determining the tractive effort required by the consist to move the train through the tunnel, establishing a maximum allowable operating temperature for each engine within the tunnel, and monitoring the ambient tunnel temperature and available oxygen within the tunnel. If it appears that any of the locomotives is not able to help maintain the overall tractive effort required to move the train through the tunnel, the locomotives are dynamically reconfigured so to maintain the level of effort necessary.

Third, upon exiting the tunnel, it is desirable to restore the locomotives back to their nominal operating conditions as quickly as possible. This requires determining when the train is approaching the tunnel exit, as well as the tractive effort required after exiting the tunnel. A preferred operating configuration for each locomotive can then be determined and each locomotive's engine power rating, cooling system and traction motor cooling requirements. Upon tunnel exit, each locomotive's engine, cooling system, and traction motor cooling are monitored to expedite the locomotive's recovery to a desired ambient operating condition. This includes monitoring the ambient temperature outside the tunnel, and the train's altitude.

Figure 2A:
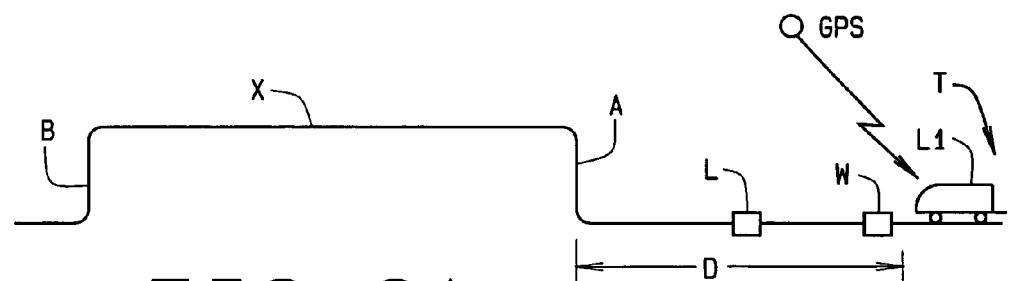
FIGS. 2A–2C are a representation of a train approaching, traveling through, and exiting a tunnel.
Figure 2B:
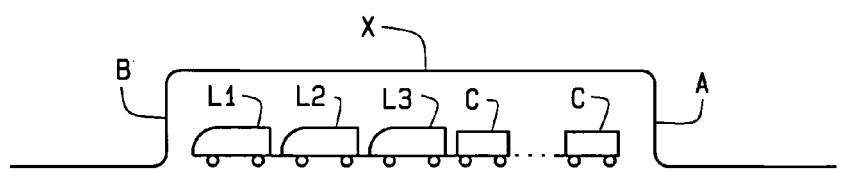
Figure 2C:
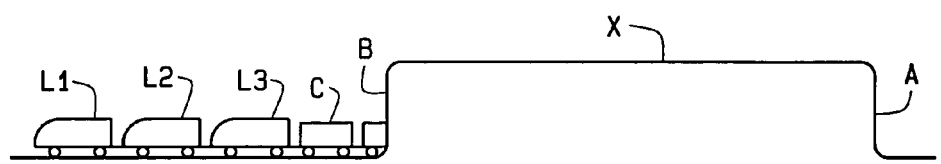
Figure 3:
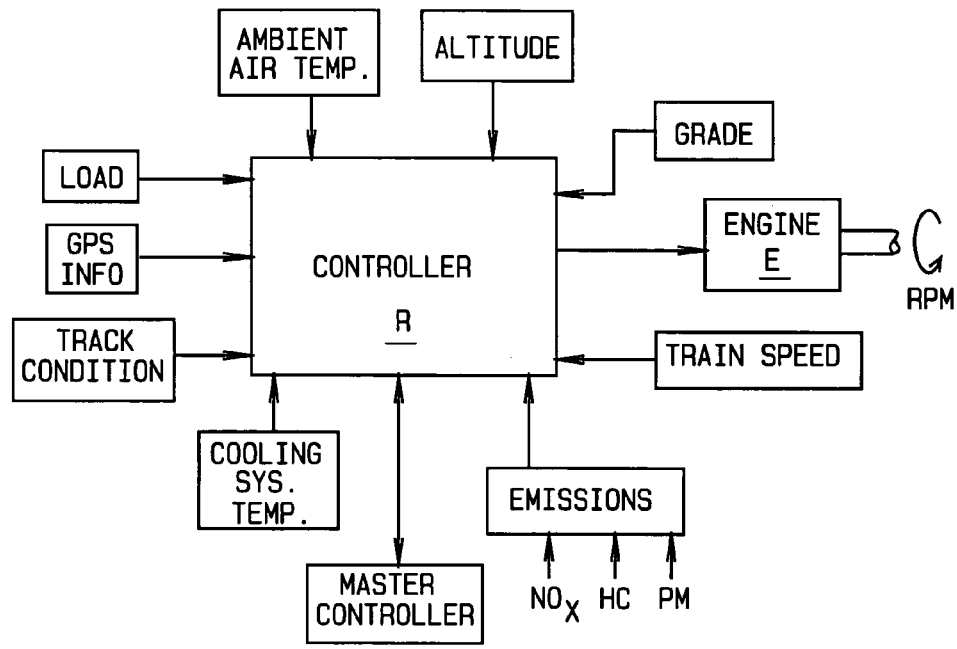
FIG. 3 is a simplified block diagram of a control scheme for a locomotive engine; and, FIG. 4 illustrates the connection between controllers for the engine of each locomotive in a consist.
Figure 4:
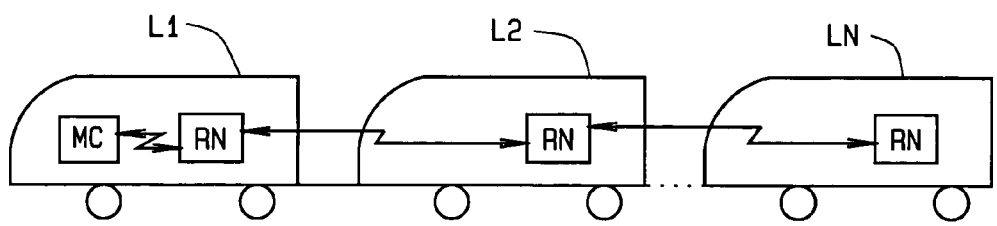

With respect to the first phase, and referring to FIGS. 2–4, as train T travels over a track, it receives location information both as to its location and entrance A of tunnel X. This information is, or can be, provided from a number of sources. It can be supplied from a global positioning system (GPS) satellite S, from trackside equipment W which provides a distance signal to the train, from distance markers L positioned along the roadway, or from elapsed time counters or the like. The train can carry a track map database accessible by an on-board computer on one or more of the locomotives. The database has tunnel information including tunnel length, altitude at both the tunnel entrance and exit, and gradient information, for example. In addition, a remote database having this information can be accessed by one or more of the locomotives, using conventional railroad communications systems. Besides position, distance, and timing information, the respective database can also include information as to preferred configurations for each locomotive in the consist when the tunnel entrance is reached, including a desired tractive effort for each locomotive. Timing calculations are made based upon the distance to the tunnel entrance and train speed, so locomotive configuration will begin with sufficient time to be completed before the entrance is reached.

As the train approaches to within a predetermined distance D from entrance A to tunnel X, a master controller MC (see FIG. 3) begins to configure each of the trains locomotives L1-Ln for passage through the tunnel. Master controller MC is linked to all of the individual engine controllers so to control operation of the individual locomotive engines to pre-configure the locomotives prior to tunnel entry, to reconfigure the locomotives as the train passes through the tunnel, and to facilitate recovery of the locomotives upon exit from the tunnel. Those skilled in the art will understand that the master controller can be implemented solely by software embedded in the existing controllers R, or it can be a separate unit such as a PC based unit interconnected with the controllers R1-Rn. In operation, the master controller takes into account each locomotives' performance capabilities, the environmental factors previously discussed, and factors such as the total tractive effort required to pull a given load at a desired speed, train location and speed, elevation, slip, direction, the position of each locomotive within the consist, overall locomotive performance, and other related information.

The controller uses information from one or more of the above sources. As shown in FIG. 3, an engine E for each locomotive is under the control of its own controller R. Each controller R has a variety of inputs on which engine operation is based. Among these are the load being pulled by the locomotive, the temperature of the engine's cooling system, emission levels from the engine, the altitude at which the engine is operating and ambient air temperature. As shown in FIG. 4, and in accordance with the system and method of the present invention, controllers R1-Rn for locomotives L1-Ln are now linked together so the operating conditions of each locomotive can be commonly considered with those of the other locomotives. The interconnection between controllers is a two-way path implemented in a number of ways. The path can be an RF link, computer modem, telephone linkage, etc. What is important is that, at the beginning of the pre-entry phase into the tunnel, each engine's current performance capabilities are known as precisely as possible.

Each locomotive is separately reconfigured based upon the various factors noted above. Those skilled in the art understand that each locomotive L1-Ln may be different from each of the other locomotives in the train. Each locomotive may have different load pulling, tractive, and maximum speed capabilities, response time to operational changes, maximum allowable operating temperatures and pressures, and, cooling systems for the engine and the locomotive's traction motors. Other factors include the overall load being pulled, ambient air conditions, the altitude at which the train is operating, emissions (NOx, HC, PM) levels, etc. Since the locomotives are operating in the open prior to tunnel entry, there is no restriction on the amount of air available for combustion. The amount of heat transfer from the engine and its cooling system to the atmosphere is a function of the ambient air temperature; the higher the temperature, the less heat transfer that will occur. By configuring all of the locomotives on an integrated basis, all of these factors are now readily taken into account so to optimize the locomotives' configurations prior to entering the tunnel.

While the system and method of the invention utilize location information as to the location of lead locomotive L1 relative to entrance A of a tunnel, this information may not always be available. Despite this, the system and method of the invention still function to dynamically configure the locomotives in the consist once the lead locomotive enters the tunnel. In this situation, entry of the train into the tunnel is detected first by the sensors supplying the information to controller R1 for the lead locomotive sensing a change, for example, in the ambient air temperature. The temperature sensors reflect the steep temperature gradient representative of the significant temperature difference from outside to inside the tunnel. Or, as the train moves into the tunnel, trailing locomotives in the consist start to sense an increase in their cooling system temperature for the reasons previously discussed. Since the lack of location information may preclude pre-cooling the engines prior to entering the tunnel and configuring (derating) one or more of the locomotives according to an operating protocol, the present invention still allows for dynamic changes to engine operation based upon these sensed changes. Master controller MC, in response to inputs from the controllers R1-Rn, can cause the respective locomotives to be simultaneously configured for continued passage through the tunnel.

Since each controller R has heretofore been used only to control operation of the locomotive in which it is installed, each locomotive has been separately configured for tunnel operation both before, and during passage through the tunnel. If a locomotive is not properly configured, or if tunnel conditions are not as expected, the locomotives' performances will vary greatly from what is expected, resulting in engine overheating, excessive fuel usage, and possibly a breakdown.

Taking the location and other pertinent information into account, optimizing each locomotive for tunnel passage including, for example, maximizing cooling of the engine and traction motors to reduce the oil and water temperature within the engine and the traction motor temperature as much as possible. Ambient operating conditions will, as noted, affect the amount of cooling which can be achieved. As previously described, because of the confined space in the tunnel and the lack of air circulation, temperatures within the tunnel will be much higher than the ambient air temperature outside the tunnel. Cooling the engines and their traction motors to lower operating temperatures (pre-cooling) prior to entering tunnel X increases the probability that the locomotives will pass through the tunnel without overheating. Changing an engine's power rating is also important. Reducing the engines' operating temperatures is also achieved by derating one or more of the locomotives by decreasing its output. This includes placing a locomotive in an idle condition where it is producing no tractive power at all.

When entering tunnel T, consists with three or more locomotives L typically encounter the following operational constraints:

First, due to air consumption of the lead locomotive L1, only a fraction (about 40%–60%) of the initially available oxygen will be available for use in combustion by the trailing locomotives. This, in turn, is likely to affect the load pulling potential or "load pot" for all locomotives after the first two, particularly if the tunnel is very long. In accordance with the invention, this potential problem is reduced by reducing the air consumption of the lead locomotives with respect to the trailing units.

Next, the hot exhaust gasses from the lead locomotives will heat up the trailing units causing hot air manifold deration as well as cooling system heating. This, in turn, will also limit the tractive effort of the trailing units. The foregoing assumes that the train speed is such that most, if not all, of the exhaust gases are pushed rearwardly. This is typically what occurs for train speeds exceeding 3–9 mph.

For the train T shown in FIG. 1A, for example, it can be envisaged that all locomotives L initially provide a substantially balanced tractive effort, but their capabilities will be affected within the tunnel, as follows:

Performance of lead locomotive L1 will not be significantly effected (derated), since it has sufficient air for combustion, and there is no recirculation of hot exhaust gases. Locomotive L2 will start to derate due to recirculation of the hot exhaust gases from locomotive L1, but not due to oxygen starvation. The performance of locomotives L3-Ln will, however, be effected both by oxygen starvation and hot exhaust circulation.

It is advantageous to distribute the tractive effort required to move the train through the tunnel among the locomotives in the consist in a predetermined manner. According to the method of the invention, therefore, controller R1 may be commanded by master controller MC to maintain locomotive L1 at a maximum power output prior to tunnel entry, while one or more of the trailing units (those expected to be oxygen starved) are idled. Those locomotives not idled are configured to provide a maximum tractive effort. However, performance of these other locomotives will then derate due to the increase in temperature they experience once they enter the tunnel.

Figure 1A:
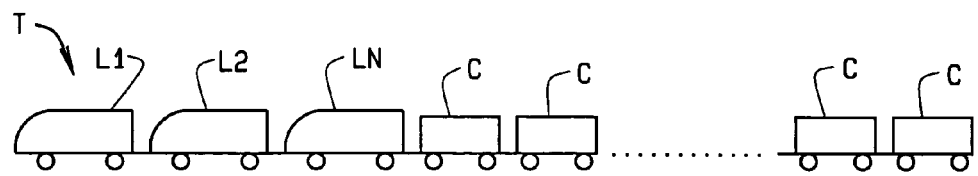
FIGS. 1A and 1B are simplified representations of train consists.
Figure 1B:
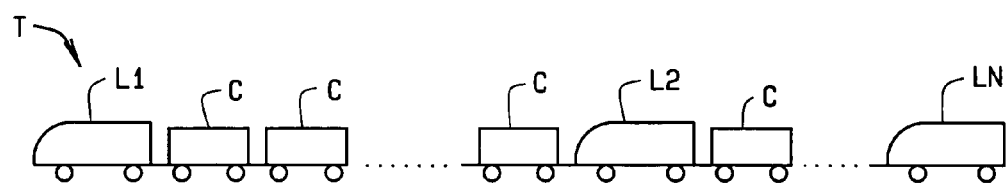

With respect to the train of FIG. 1A, for example; since, as noted above, there may only be sufficient oxygen for use by the leading locomotives, locomotives L1 and L2 are be configured for full tractive effort; while locomotives L3-Ln are configured for idling. Alternately, the locomotives are configured so that upon entering tunnel X, locomotive L1 is operating at its full tractive effort. The next locomotive, L2, is configured for idling. The next locomotive, L3, is also configured to operate at its full tractive effort. The remaining locomotives L4-Ln are configured for idling. In each instance, lead locomotive L1 is intended to remain at full tractive effort throughout transit of tunnel X; while, the second operating locomotive (locomotive L2 in the first example, locomotive L3 in the second) is derated due to temperature only. It will be understood by those skilled in the art that the strategy implemented takes into account the location of the locomotives within the train so to distribute the tractive effort needed. The cars C between the locomotives actually help replenish oxygen in the tunnel as well as reduce tunnel temperature because of the spacing between locomotives provided by the cars. Thus, for example, if there were four locomotives in the consist of FIG. 1B, locomotives L1 and L4 could be fully rated while locomotive L2 and L3 are configured for idle. Because of the tunnel wall cooling effect created by the large number of cars between locomotives L1 and L4, these two locomotives could remain fully rated throughout tunnel passage.

Importantly, it is a feature of the invention to dynamically change the configuration of the engines in response to conditions encountered during transit through tunnel X. Those skilled in the art will appreciate that information sensed or monitored at one location can also be extrapolated to ascertain information about operating conditions at other locations. For example, if the cooling temperature in locomotive L2 in the first example starts to increase to a point where the locomotive must be derated, master controller MC, in response to inputs from the different controllers R1-Rn, can simultaneously move locomotive L2 to an idling condition, while bringing locomotive L3 from its idling condition to full tractive power. Currently, this is not possible to do dynamically. Alternatively, the master controller can derate locomotive L2 to a lower operating condition, while bringing more than one of the other idling locomotives on-line. Again, according to the method of the invention, these actions are performed simultaneously, and dynamically, in response to sensed conditions within the tunnel and pre-established criteria with respect to maximum operating temperatures for each engine, for example. Overall, the system and method of the invention are implemented for consists of three locomotives or more. The result is to maintain an overall tractive effort of the train sufficient to move the train through tunnel X, with the configuration of the various locomotives being dynamically adjusted (as a function oxygen availability and consumption, tunnel length, grade, total load, and the environment within the tunnel including air flow, internal heat dissipation, and altitude) to accomplish this result.

Upon leaving tunnel T through exit B, the system and method of the invention function to bring all of the locomotives back up to a desired operating configuration. Exiting tunnel X can be determined in different ways. One way is by monitoring train speed through the tunnel. Since the length of the tunnel is known as in train speed, master controller MC can readily compute how long it will be before exit B is reached by lead locomotive L1, and then by the other locomotives. Another way is the steep temperature gradient which is experienced as the lead locomotive moves from the high temperature within the tunnel into the relatively cooler air outside the tunnel. Regardless of how determined, based upon known or anticipated conditions beyond the tunnel, the tractive effort for each locomotive can be determined. This determination includes the current operating status including current tractive effort of each locomotive and how it has operated during tunnel transit. These determinations are made on-board as is the time at which changes in configuration should begin.

Reducing recovery time of the locomotives is accomplished according to a variety of protocols. One way of doing this is to switch any idling locomotives within the consist to full tractive effort either immediately upon exiting the tunnel, or as each locomotive approaches the exit. For example, an idling locomotive could start ramping from its idling speed beginning ten (10) seconds, or some other predetermined time before the exit is reached. At the same time idling or near idling locomotives begin their increase toward their full tractive effort, those locomotives which have been operating at or near this level can begin to be derated. Thus, for example, if locomotives L1 and L2 have been operating at their full power, and locomotive L3 has been idling, when locomotive L3 reaches a point where tunnel exit B is ten seconds ahead, master controller MC commands this locomotive to start increasing its operating capability, while locomotives L1 and L2 simultaneously begin to be derated. Since limited oxygen availability is no longer a concern as the train exits the tunnel, locomotive L3 should be able to quickly reach its full capability and maintain it. Because of thermal heating effects resulting from the exhaust gases in the tunnel, it sometimes takes several minutes (typically 3–5 minutes) for a locomotive to reach a desired operating level. However, by pre-emptively increasing one or more locomotives toward their full rating before tunnel exit B is reached, while simultaneously derating those locomotive which have operated at or near full rating lessens the time for full recovery of those locomotives without significantly effecting the overall combined tractive effort of the locomotives.

In another example, locomotive L1 is derated for tunnel transit with locomotives L2 and L3 configured to operate at full power during passage through the tunnel. If during tunnel transit, locomotive L3 is derated because of the conditions previously discussed, the system and method of the invention operate to derate locomotive L3, while bringing locomotive L1 up to full power. This can be done so that locomotive L1 comes to full power immediately before train T exits tunnel X, and enables the train to achieve total train tractive effort almost immediately upon leaving the tunnel. Again, those skilled in the art will appreciate that upon exit from tunnel X, the recovery of locomotive L3 is a function of its thermal recovery and not oxygen starvation.

The system and method of this invention provide a flexibility in consist control not previously available for tunnel operations. Again, this is due to the ability to dynamically respond to sensed conditions by simultaneously reconfiguring locomotives within the consist due to sensed locomotive operating conditions during tunnel transit, as well a predictive capability allowing the locomotives to be properly configured prior to tunnel entrance and again prior to the tunnel exit. In addition to the previous examples, the system and method of the invention operate for a wide range of locomotive configurations.

Implementation of the system and method of the invention can include preparing a schedule, stored in the master controller, which includes information concerning all railroad tunnels within a geographic area; for example, the United States, Canada, Mexico. For each tunnel, the GPS co-ordinates for the ends of the tunnel can be entered, in addition to information such as the grade within the tunnel. Once a route for the train is known, the master controller can pre-plan the configuration for the locomotives based upon the tunnel location information.

Finally, while the system and method of the invention have been described for consists of three or more locomotives, it will be understood by those skilled in the art that portions of the invention, such as pre-cooling a locomotive prior to entering a tunnel, also can be employed with single and dual locomotive consists without departing from the scope of the invention. It will further be understood that this strategy also applies to other structures or systems in which air-flow and heat dissipation are operational considerations.

In view of the above, it will be seen that the several objects of the invention are achieved and other advantageous results are obtained. As various changes could be made in the above constructions without departing from the scope of the invention, it is intended that all matter contained in the above description or shown in the accompanying drawings shall be interpreted as illustrative and not in a limiting sense.

The invention claimed is:

1. A method of controlling passage of a train employing a plurality of locomotives through a tunnel so as to meet an overall movement plan for the train, the method comprising:

configuring predetermined operating characteristics of at least one selected locomotive in the train in preparation for the passage of the train through the tunnel as the train approaches an entrance to The tunnel;

monitoring conditions within the tunnel and the performance of the selected locomotive as the train passes through the tunnel, including dynamically changing the configuration of the operating characteristics of the selected locomotive as a function of the monitored conditions within the tunnel, the performance of the selected locomotive, and the performance of other locomotives of the train while in the tunnel, so as to achieve a total tractive effort of the train provided by the plurality of locomotives of the train sufficient to move the train through the tunnel in accordance with the plan and to optimize the performance of the locomotive; and, reconfiguring the operating characteristics of the selected locomotive as the train approaches the exit of the tunnel to facilitate recovery of the selected locomotive from the effects of passage through the tunnel.

2. The method of claim 1 further including dynamically changing the configuration of the selected locomotive as the train approaches, passes through, and exits the tunnel.

3. The method of claim 2 further including ascertaining the location of the train relative to the exit from the tunnel and configuring the selected locomotive for recovery from passage through the tunnel prior to the locomotive reaching the tunnel exit.

4. A method of configuring a locomotive of a train comprising a plurality of locomotives in preparation for passage of the locomotive through a tunnel so as to meet an overall movement plan for the train comprising:

determining the current operating condition of the locomotive; establishing a desired set of operating conditions for entry of the locomotive into the tunnel;

determining the time or distance for the locomotive to reach the tunnel entrance; and changing the performance characteristics of the locomotive to attain the desired set of operating conditions within the time or distance for the locomotive to reach the tunnel entrance;

in which the locomotive is one of a plurality of locomotives comprising a consist and the method includes changing the operating conditions of each locomotive in the consist to a desired set thereof prior to each locomotive reaching the tunnel entrance effective to meet a movement plan for the train while traversing the tunnel.

5. The method of claim 4 further including dynamically changing the operating conditions of the locomotives to attain the desired set of operating conditions for each locomotive.

6. The method of claim 5 wherein the locomotive comprises an engine having a cooling system, and traction motors having cooling systems, and in which the desired set of operating conditions for each locomotive comprises the tractive effort of other locomotives in the consist.

7. The method of claim 4 in which adjusting the performance of each locomotive is controlled by a computer on each locomotive.

8. The method of claim 4 in which adjusting the performance of each locomotive is controlled by a computer on one of the locomotives which controls an operation of each of the locomotives.

9. The method of claim 4 in which adjusting the performance of each locomotive is controlled by remotely monitoring the current operating conditions of each locomotive and transmitting a control signal to each locomotive to adjust its performance to the desired set of operating conditions.

10. The method of claim 4 in which determining the time or distance of the locomotive relative to the tunnel entrance includes monitoring a wayside distance signal provided to the locomotive.

11. The method of claim 10 in which determining the time or distance of the locomotive relative to the tunnel entrance includes providing global positioning system (GPS) information to the locomotive.

12. The method of claim 4 in which determining the time or distance of the locomotive relative to the tunnel entrance includes accessing a track map database stored on the locomotive, the database including information on anticipated conditions within the tunnel.

13. The method of claim 5 in which configuring each locomotive for passage through the tunnel includes derating at least one of the locomotives by reducing its power output from a nominal level of operation.

14. The method of claim 13 further including placing one or more of the locomotives in an idle condition.

15. The method of claim 4 wherein the locomotive comprises an engine having a cooling system and the method further includes increasing the level of heat dissipation of the locomotive cooling system to lower oil and water temperatures within the engine prior to entry of the locomotive into the tunnel.

16. A method of controlling passage through a tunnel of a train employing a plurality of locomotives including a lead locomotive and at least one trailing locomotive so as to meet a movement plan comprising:

monitoring conditions within the tunnel;
monitoring the performance of each trailing locomotive as the train passes through the tunnel; and
dynamically changing the configuration of the operating characteristics of each trailing locomotive as a function of the monitored conditions within the tunnel and the current performance of each trailing locomotive while in the tunnel, so to achieve tractive effort sufficient to move the train through the tunnel in accordance with the plan and to optimize the performance of each trailing locomotive.

17. The method of claim 16 further including dynamically changing the configuration of the trailing locomotives based upon the monitored conditions and each locomotive's performance.

18. The method of claim 16 wherein the locomotive comprises an engine and the monitoring includes measuring parameters indicative of the level of oxygen available for combustion by the locomotive engine at at least one location within the tunnel.

19. The method of claim 18 wherein the monitoring conditions within the tunnel further includes measuring the air temperature within the tunnel at at least one location within the tunnel.

20. The method of claim 19 further including extrapolating from the measured values, oxygen availability and tunnel temperature at intermediate locations within the tunnel.

21. The method of claim 16 wherein configuring the locomotive for passage through the tunnel includes sensing an ambient temperature change which occurs when the locomotive enters the tunnel whereby the locomotive can be configured for passage through the tunnel even if the entrance to the tunnel cannot he determined prior to the locomotive entering the tunnel.

22. The method of claim 17 wherein the monitoring the performance of each trailing locomotive includes measuring the tractive effort of each locomotive.

23. The method of claim 20 further including derating a locomotive if available oxygen within the tunnel decreases.

24. The method of claim 16 wherein dynamically changing the operation of a trailing locomotive includes adjusting locomotive operating characteristics as a function of at least one of oxygen availability, tunnel length, grade, total load, air flow, and altitude.

25. A method of configuring a locomotive in a train in preparation for exit of the locomotive from a tunnel comprising:
determining the current operating condition of the locomotive while in the tunnel;
determining a desired set of operating conditions for the locomotive as the train exits the tunnel to facilitate recovery of the locomotive from the effects of passage through the tunnel and attain a desired post-tunnel configuration as quickly as possible upon exiting the tunnel;
detemining the time or distance for the locomotive to reach the exit from the tunnel; and
changing the performance characteristics of the locomotive to attain the desired set of operating conditions within the time or distance for the locomotive to reach the tunnel exit.

26. The method of claim 25 in which the locomotive comprises having a cooling system and traction motors having cooling systems, and changing the locomotive performance characteristics includes adjusting at least one of the temperature of the locomotive traction motor cooling systems; and the tractive effort of other locomotives in the train.

27. The method of claim 25 in which changing the performance characteristics of the locomotive is controlled by computer on the locomotive.

28. The method of claim 25 in which determining the time or distance for the locomotive reach the exit includes accessing a track map database maintained on the locomotive.

* * * * *